(12) United States Patent
Sun et al.

(10) Patent No.: US 12,093,134 B2
(45) Date of Patent: Sep. 17, 2024

(54) METHOD, DEVICE, AND COMPUTER STORAGE MEDIUM FOR MANAGING TRACE RECORD

(71) Applicant: EMC IP Holding Company LLC, Hopkinton, MA (US)

(72) Inventors: Lei Sun, Beijing (CN); Shaoqin Gong, Beijing (CN); Jianbin Kang, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/991,507

(22) Filed: Aug. 12, 2020

(65) Prior Publication Data
US 2021/0334166 A1    Oct. 28, 2021

(30) Foreign Application Priority Data
Apr. 24, 2020 (CN) .......................... 202010334310.2

(51) Int. Cl.
*G06F 11/14* (2006.01)
*G06F 16/23* (2019.01)

(52) U.S. Cl.
CPC ...... *G06F 11/1451* (2013.01); *G06F 16/2379* (2019.01); *G06F 2201/80* (2013.01); *G06F 2201/82* (2013.01)

(58) Field of Classification Search
CPC ............. G06F 11/1451; G06F 16/2379; G06F 2201/80; G06F 2201/82
See application file for complete search history.

(56) References Cited

U.S. PATENT DOCUMENTS

| | | | |
|---|---|---|---|
| 9,830,215 B1 | 11/2017 | Mathew et al. | |
| 10,114,731 B2 | 10/2018 | Fan et al. | |
| 11,068,184 B2 | 7/2021 | Jia et al. | |
| 2005/0055351 A1* | 3/2005 | Barton | G06F 16/23 |
| 2005/0223364 A1* | 10/2005 | Peri | G06F 11/3636 |
| | | | 717/128 |
| 2010/0106896 A1* | 4/2010 | Bildgen | G06F 11/1441 |
| | | | 711/103 |

(Continued)

FOREIGN PATENT DOCUMENTS

| | | |
|---|---|---|
| CN | 104378442 | 2/2015 |
| CN | 106886600 | 6/2017 |

*Primary Examiner* — Mark D Featherstone
*Assistant Examiner* — Tony Wu
(74) *Attorney, Agent, or Firm* — BainwoodHuang

(57) ABSTRACT

Techniques manage tracking records in an application system which includes an active dump file and an inactive dump file. A set of tracking records indicating a state of the application system is received. The set of tracking records is added to the active dump file. A storage signal for storing the active dump file into a backup device associated with the application system is generated according to a determination that a size of the active dump file meets a predetermined size threshold and according to a determination that a state of the inactive dump file is a ready state. The ready state indicates that the inactive dump file is available for storing another set of tracking records to be received in the future. Accordingly, two dump files may alternately store tracking records, and copies of the dump files may be continuously stored into a backup device to improve reliability.

10 Claims, 11 Drawing Sheets

(56) References Cited

U.S. PATENT DOCUMENTS

| | | | | |
|---|---|---|---|---|
| 2015/0006963 A1* | 1/2015 | Geisert | ............... | G06F 11/0781 |
| | | | | 714/38.11 |
| 2015/0160994 A1* | 6/2015 | Niwa | ................. | G06F 11/0778 |
| | | | | 714/19 |
| 2016/0364317 A1* | 12/2016 | Rehman | ............... | G06F 11/3664 |
| 2020/0293193 A1* | 9/2020 | Littlefield | ............... | G06F 3/065 |
| 2020/0379915 A1* | 12/2020 | Moertl | ................ | G06F 12/0246 |

* cited by examiner

METHOD, DEVICE, AND COMPUTER STORAGE MEDIUM FOR MANAGING TRACE RECORD

CROSS-REFERENCE TO RELATED APPLICATION

This application claims priority to Chinese Patent Application No. CN202010334310.2, on file at the China National Intellectual Property Administration (CNIPA), having a filing date of Apr. 24, 2020, and having "METHOD, DEVICE, AND COMPUTER STORAGE MEDIUM FOR MANAGING TRACE RECORD" as a title, the contents and teachings of which are herein incorporated by reference in their entirety.

TECHNICAL FIELD

Various implementations of the present disclosure relate to management of an application system, and more particularly, to a method, a device, and a computer program product for managing tracking records in an application system.

BACKGROUND

With the development of computer technologies, there have been many types of application systems currently. In order to ensure stable operations of an application system, a state of the application system may be continuously tracked. States collected at different time points may be stored in a tracking record, and the tracking record may be written to a storage device in the application system. Technical solutions for managing tracking records have been proposed at present. However, the execution efficiency of the technical solutions is not satisfactory. In this case, how to manage tracking records in an application system has become a research hotspot.

SUMMARY OF THE INVENTION

Therefore, it is desirable to develop and implement a technical solution for managing tracking records in an application system in a more efficient way. It is desirable that the technical solution is compatible with existing application systems and can perform operations related to management of a tracking record in a more efficient way by modifying various configurations of existing application systems.

According to a first aspect of the present disclosure, a method for managing tracking records in an application system is provided. Here, the application system includes an active dump file and an inactive dump file. In one method, a set of tracking records indicating a state of the application system is received. The set of tracking records is added to the active dump file. A storage signal for storing the active dump file into a backup device associated with the application system is generated according to a determination that a size of the active dump file meets a predetermined size threshold and according to a determination that a state of the inactive dump file is a ready state. The ready state indicates that the inactive dump file is available for storing another set of tracking records to be received in the future.

According to a second aspect of the present disclosure, an electronic device is provided. The electronic device includes: at least one processor; and a memory coupled to the at least one processor and having instructions stored therein. When executed by the at least one processor, the instructions cause the device to execute actions for managing tracking records in an application system. Here, the application system includes an active dump file and an inactive dump file. The actions include: receiving a set of tracking records indicating a state of the application system; adding the set of tracking records to the active dump file; and generating a storage signal for storing the active dump file into a backup device associated with the application system according to a determination that a size of the active dump file meets a predetermined size threshold and according to a determination that a state of the inactive dump file is a ready state, the ready state indicating that the inactive dump file is available for storing another set of tracking records to be received in the future.

According to a third aspect of the present disclosure, a computer program product is provided. The computer program product is tangibly stored on a non-transitory computer-readable medium and includes machine-executable instructions for performing the method according to the first aspect of the present disclosure.

BRIEF DESCRIPTION OF THE DRAWINGS

The features, advantages, and other aspects of various implementations of the present disclosure will become more apparent in conjunction with the accompanying drawings and with reference to the following detailed description. Several implementations of the present disclosure are shown here by way of example and not limitation. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred implementations of the present disclosure will be described in more detail below with reference to the accompanying drawings. Although preferred implementations of the present disclosure are illustrated in the accompanying drawings, it should be understood that the present disclosure may be implemented in various forms and should not be limited by the implementations illustrated herein. Rather, these implementations are provided to make the present disclosure more thorough and complete, and will fully convey the scope of the present disclosure to those skilled in the art.

The term "include" and its variants as used herein mean open inclusion, i.e., "including, but not limited to." Unless specifically stated, the term "or" means "and/or." The term "based on" means "based at least in part on." The terms "one example implementation" and "one implementation" mean "at least one example implementation." The term "another implementation" means "at least one additional implementation." The terms "first," "second," etc. may refer to different or identical objects. Other explicit and implicit definitions may be further included below.

It will be appreciated that the application system here may be an application system for performing various functions. In particular, the application system may be a storage system for providing storage services to users, an email system for providing email services to users, a sales system for providing shopping services to users, and the like. For convenience of description, specific implementations of the present disclosure will be described below with only a storage system as an example of an application system.

Figure 1:
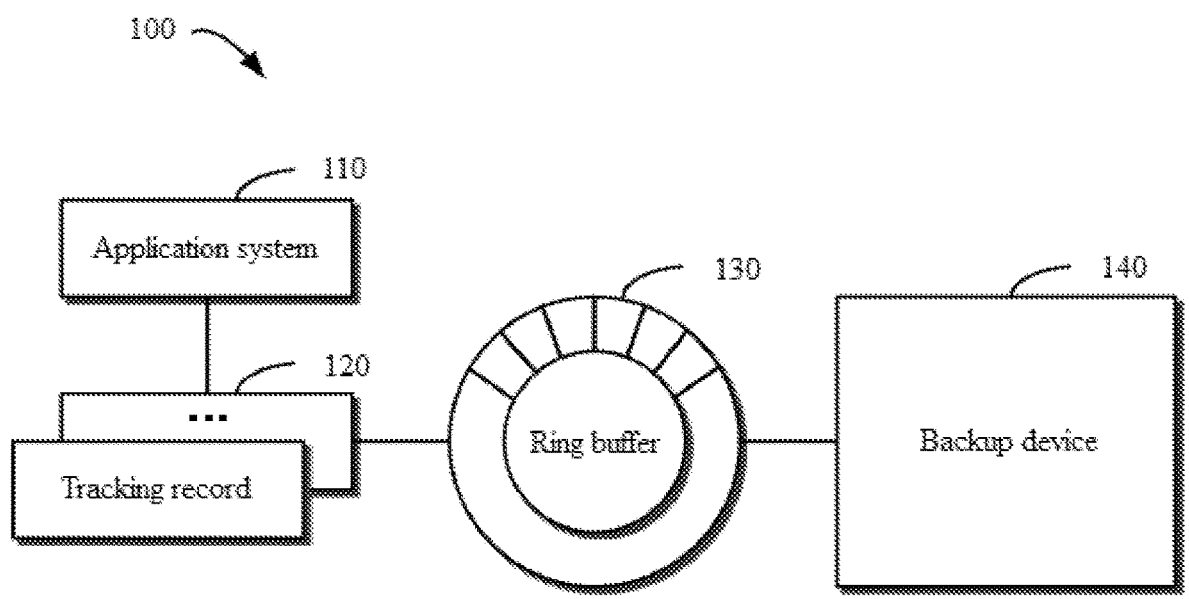
FIG. 1 schematically illustrates a block diagram of a process for managing tracking records in an application system according to a technical solution.

An application environment of an example implementation of the present disclosure will be first described with reference to FIG. 1. FIG. 1 schematically illustrates block diagram 100 of a process for managing tracking records in an application system according to a technical solution. As shown in FIG. 1, states of application system 110 at different time points may be collected, and the collected states may be stored in multiple tracking records 120 respectively. Currently, a technical solution for buffering multiple tracking records 120 based on ring buffer 130 has been proposed.

In this technical solution, it is necessary to periodically store tracking records in ring buffer 130 to backup device 140. In existing storage systems, tracking records are only stored in one backup device 140, with no other copies formed. When backup device 140 fails, the tracking records cannot be restored. Storing the records in ring buffer 130 to backup device 140 in a storage system may affect the read and write performance of the storage system itself. In addition, there is a threshold limit to a size of ring buffer 130. When ring buffer 130 is filled, the previous tracking record will be overwritten.

Thus, it is desirable to provide a more efficient way to manage tracking records. In order to solve the defects in existing technical solutions, an example implementation of the present disclosure proposes a method for managing tracking records in an application system. According to an example implementation of the present disclosure, an active dump file and an inactive dump file are proposed. The above two files may be used to store tracking records, and a signal may be generated to indicate a need to store a dump file into another storage device. Hereinafter, an overview of an example implementation of the present disclosure will be first described with reference to FIG. 2.

Figure 2:
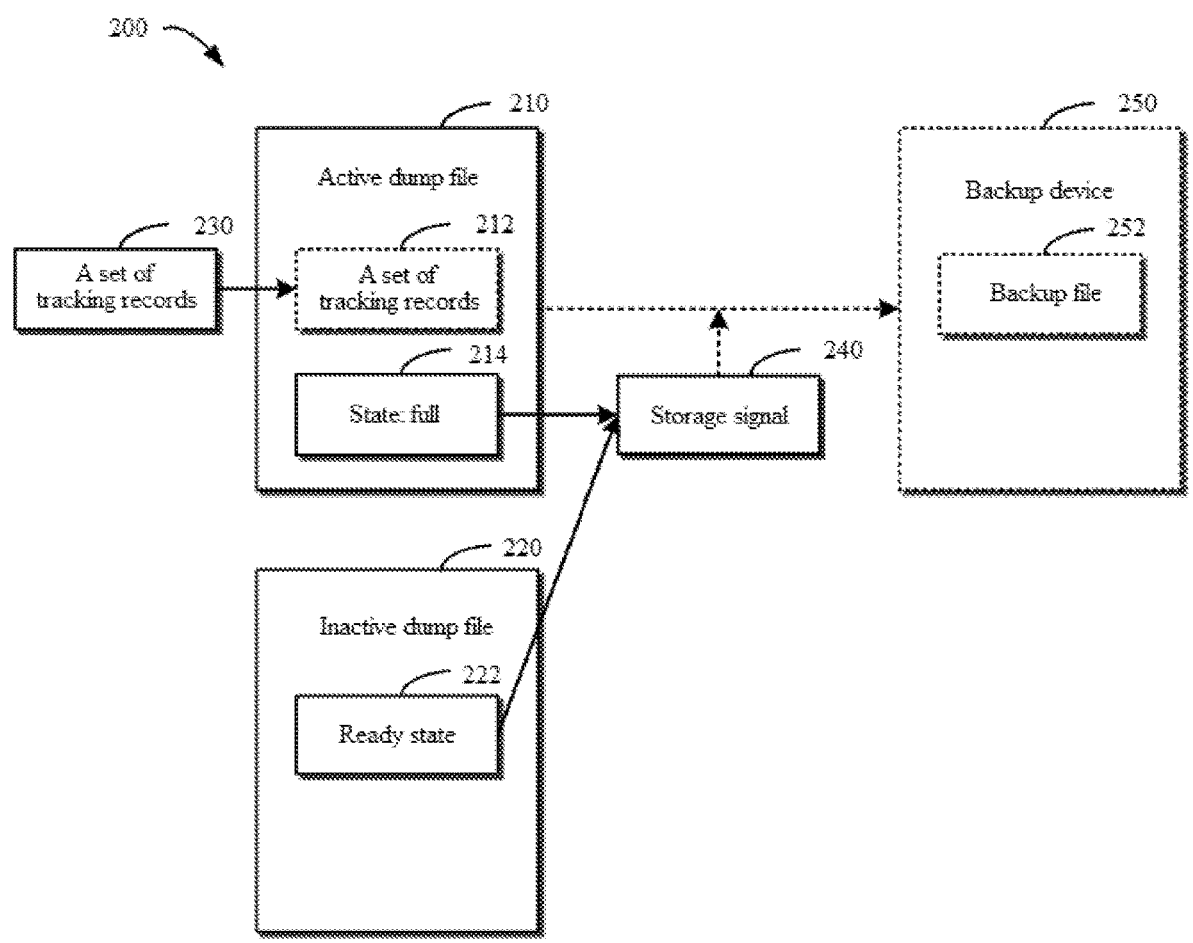
FIG. 2 schematically illustrates a block diagram of a process for managing tracking records in an application system according to an example implementation of the present disclosure.

FIG. 2 schematically illustrates block diagram 200 of a process for managing tracking records in an application system according to an example implementation of the present disclosure. As shown in FIG. 2, the application system may include active dump file 210 and inactive dump file 220, and may alternately store a set of received tracking records 230 based on the two dump files.

Specifically, a set of newly received tracking records 230 is added to active dump file 210 to form a set of tracking records 212. Tracking records may be continuously received. When state 214 of active dump file 210 is "full," whether to generate storage signal 240 may be determined based on the state of inactive dump file 220. If inactive dump file 220 is in ready state 222, storage signal 240 may be generated. With an example implementation of the present disclosure, two dump files may alternately store the received tracking records. In this way, an intermediate-layer dump file is disposed between tracking records and backup device 250, thus avoiding an error of overwriting the previously stored tracking records when the ring buffer is full in existing technical solutions.

Further, storage signal 240 may start storing active dump file 210 to backup device 250, so as to form backup file 252 in backup device 250. In this way, a copy of a dump file may be continuously stored in backup device 250 with a larger storage space, so as to provide more storage space and higher reliability.

Figure 3:
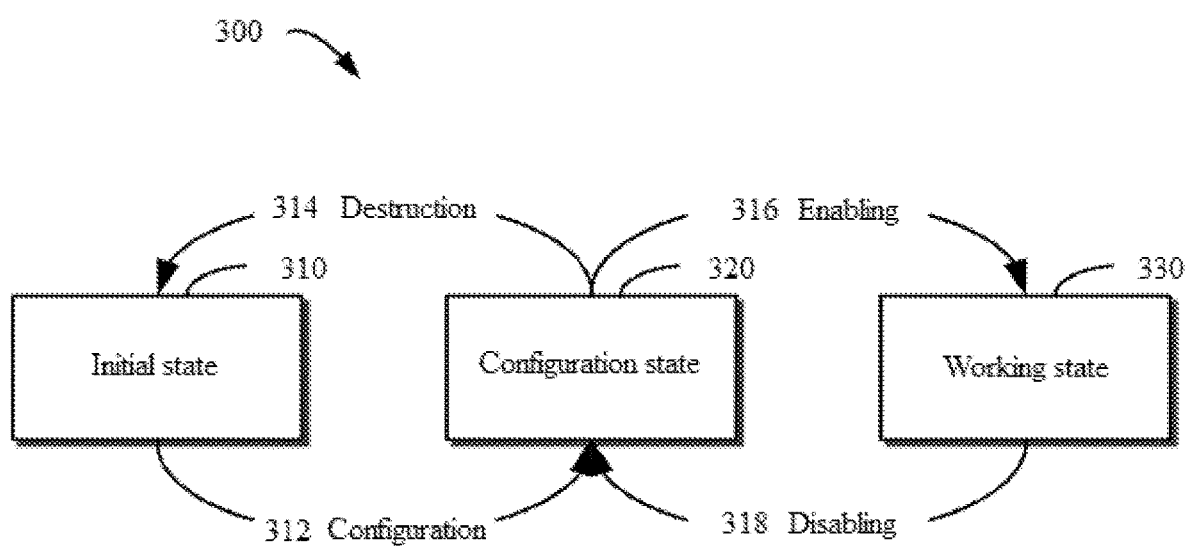
FIG. 3 schematically illustrates a block diagram of switching between multiple states for managing tracking records in an application system according to an example implementation of the present disclosure.

FIG. 3 schematically illustrates block diagram 300 of switching between multiple states for managing tracking records in an application system according to an example implementation of the present disclosure. According to an example implementation of the present disclosure, there may be initial state 310, configuration state 320, and working state 330. Here, initial state 310 may be an initial state in which tracking records are collected. During the start of the application system, initialization operations related to managing tracking records have been performed. For example, a buffer for storing tracking records and a data structure of a dump file, as well as a signal for indicating switching between various states, and the like are generated. Configuration state 320 may indicate a state in which configuration has been performed and management of tracking records has been started. Specifically, a buffer size of tracking records, a size of a dump file, as well as a network address of the backup device, and the like have been set at this moment. Working state 330 indicates a state in which configuration has been completed and the collected tracking records may be received and stored.

Various states may be switched (by means of operations or specialized circuitry performing such operations). For example, by means of configuring operation 312, initial state 310 may be switched to configuration state 320. By means of destructing operation 314, configuration state 320 may be switched to configuration state 310. By means of enabling operation 316, configuration state 320 may be switched to working state 330. By means of disabling operation 318, working state 330 may be switched to configuration state 320.

Figure 4:
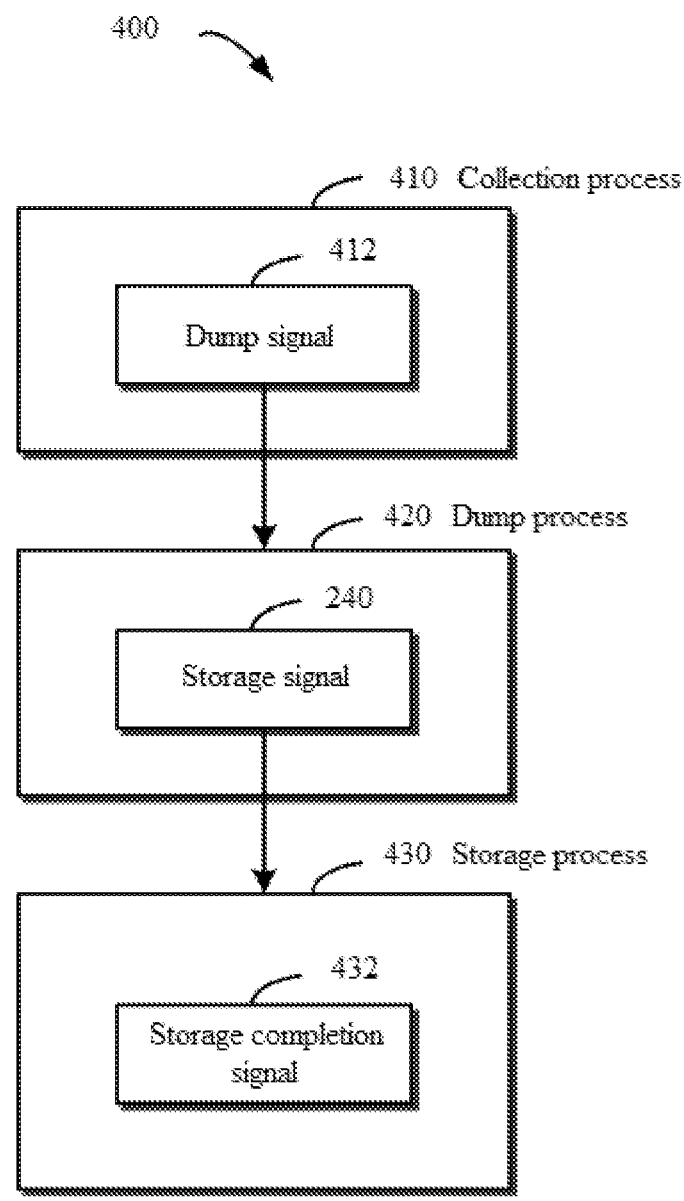
FIG. 4 schematically illustrates a block diagram of a method for managing tracking records in an application system according to an example implementation of the present disclosure.

According to an example implementation of the present disclosure, the operations performed in working state 330 may involve multiple processes. Hereinafter, more description will be provided with reference to FIG. 4. FIG. 4 schematically illustrates block diagram 400 of a method for managing tracking records in an application system according to an example implementation of the present disclosure. As shown in FIG. 4, working state 330 may involve collection process 410, transmission process 420, and storage process 430. Transmission signal 412, storage signal 240, and storage completion signal 432 may be provided to transfer messages between various processes.

As shown in FIG. 4, collection process 410 may involve writing a collected tracking record to a buffer. When the buffer is full, transmission signal 410 may be generated to initiate dump process 420. During the dump process, a set of tracking records in the buffer may be dumped into a dump file. When the dump file is full, storage signal 240 may be generated to start storage process 430 to store tracking records in the dump file to the backup device. When the storage is completed, storage completion signal 432 may be generated to notify dump process 420.

Figure 5:
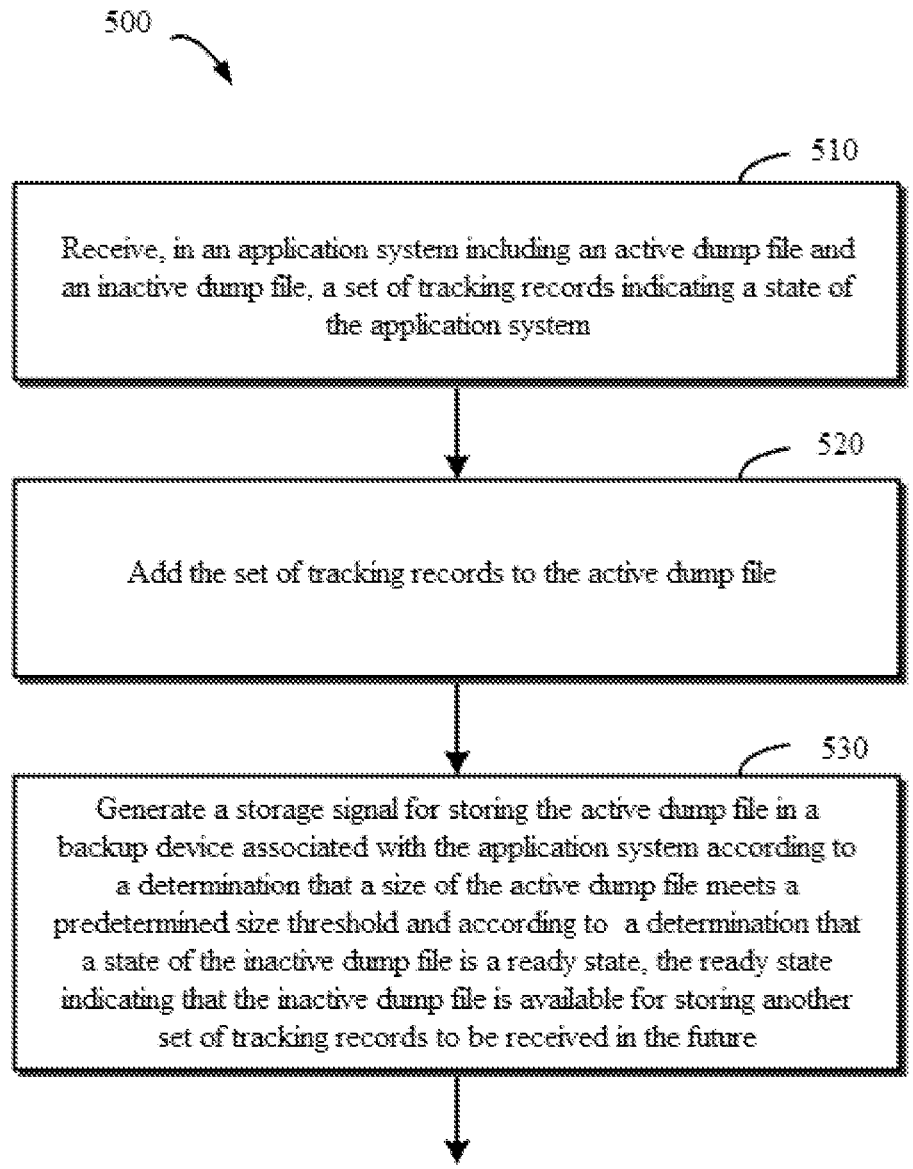
FIG. 5 schematically shows a flowchart of a method for managing tracking records in an application system according to an example implementation of the present disclosure.

Hereinafter, more details about the dump process will be described with reference to FIG. 5. FIG. 5 schematically shows a flowchart of method 500 for managing tracking records in an application system according to an example implementation of the present disclosure. As shown in FIG. 5, at block 510, in an application system including an active dump file and an inactive dump file, a set of tracking records 230 indicating a state of application system 110 is received. According to an example implementation of the present disclosure, a set of tracking records 230 may be received from a buffer of application system 110.

Figure 6:
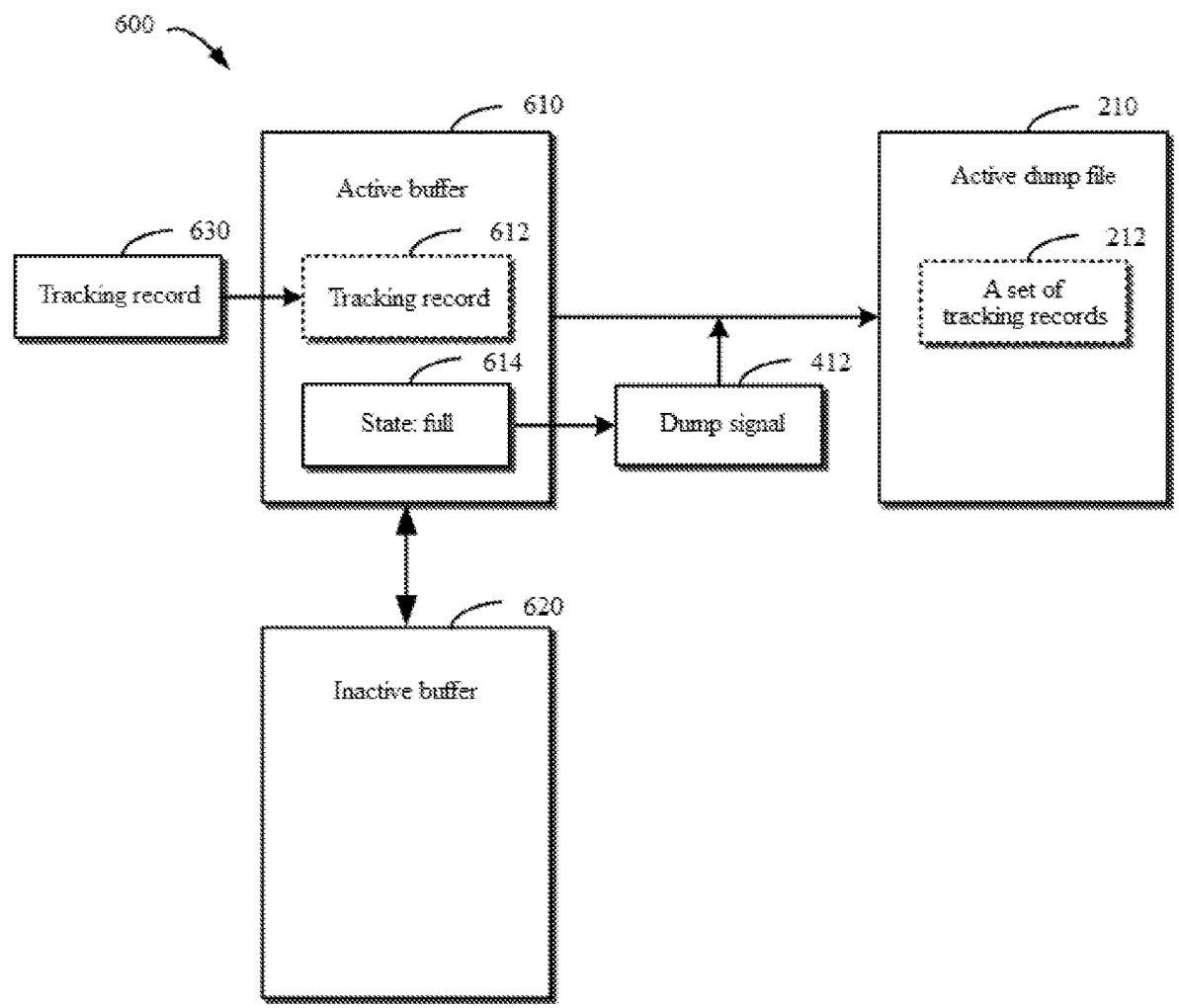
FIG. 6 schematically illustrates a block diagram of a process for collecting tracking records according to an example implementation of the present disclosure.

FIG. 6 schematically illustrates block diagram 600 of a process for collecting tracking records according to an example implementation of the present disclosure. As shown in FIG. 6, application system 110 may include active buffer 610 and inactive buffer 620. A size of the buffer may be set in advance. For example, the buffer may be set to accommodate n (n is a positive integer) tracking records. Active buffer 610 and inactive buffer 620 may have the same size. In an initial stage, both buffers are empty. Here, active buffer 610 is used to receive collected tracking records 630. Collected tracking records 630 may be stored in active buffer 610 to form tracking record 612. Newly collected tracking records may be continuously added to active buffer 610 until active buffer 610 reaches a full state.

State 614 of active buffer 610 may be determined based on a comparison between the number of tracking records included in active buffer 610 and a value n. If the state is full, dump signal 412 may be generated to start a process of dumping a set of tracking records in active buffer 610 to active dump file 210. According to an example implementation of the present disclosure, it is only necessary to compare the number of tracking records in active buffer 610 with a predetermined number threshold to determine the time to invoke a dump operation. In this way, dump process 420 does not need to care about a specific operation process of how to collect each tracking record, but can read a set of collected tracking records once when the number of the collected tracking records reaches a predetermined number n, thereby improving the performance of dump process 420.

Further, active buffer 610 and inactive buffer 620 may be exchanged. In other words, active buffer 610 and inactive buffer 620 may be exchanged according to a determination that the number of tracking records in active buffer 610 meets a predetermined number threshold. A new active buffer will replace an old active buffer that is full and continue to store tracking records. With an example implementation of the present disclosure, it can be ensured that there is always an active buffer during the collection of tracking records to accommodate newly collected tracking records. Compared with a conventional ring buffer, the situation that subsequent tracking records overwrite previous tracking records due to untimely storage can be avoided.

After the exchange, a new collected tracking record will be stored in a current active buffer (that is, original inactive buffer 620). Tracking records may be continuously collected based on a method similar to that described above. If the current active buffer is full, a next dump signal may be generated to dump tracking records into a dump file.

Figure 7:
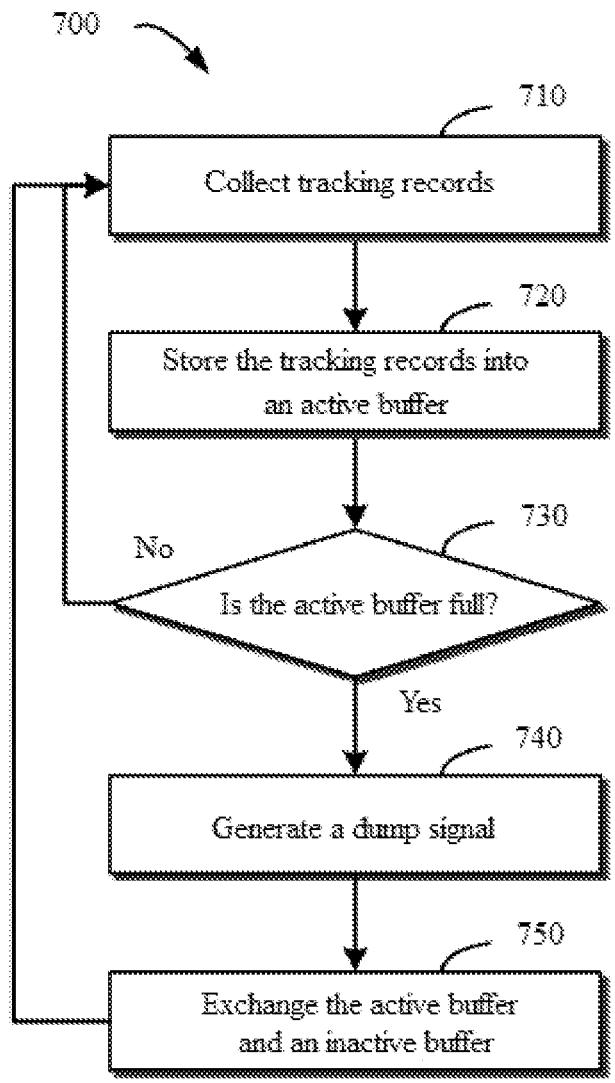
FIG. 7 schematically shows a flowchart of a method for collecting tracking records according to an example implementation of the present disclosure.

FIG. 7 schematically shows a flowchart of method 700 for collecting tracking records according to an example implementation of the present disclosure. At block 710, a tracking record describing a state of an application system may be collected from a monitoring system. At block 720, the collected tracking record may be stored in active buffer 610. At block 730, it may be continuously determined whether active buffer 610 is full. If active buffer 610 is full, method 700 proceeds to block 740 to generate dump signal 412. If the buffer is not full, method 700 returns to block 710 to continue collecting a next tracking record. Generated dump signal 412 may be used to notify dump process 420 to receive a set of tracking records (that is, a set of records in the active buffer). Further, at block 750, an active buffer and an inactive buffer may be exchanged.

Returning to block 510 in FIG. 5, if dump signal 412 is received, a set of tracking records may be retrieved from active buffer 610. If dump signal 412 is not received, dump signal 412 may be awaited for generation. With an example implementation of the present disclosure, dump signal 412 may notify of the time to receive a set of tracking records. In this way, additional resource overheads caused by the need to continuously view whether the ring buffer has been filled in existing technical solutions can be avoided.

The specific operations related to collecting a set of tracking records 230 have been described above. Hereinafter, how to process a set of received tracking records 230 will be described. At block 520, the set of tracking records 230 is added to active dump file 210. According to an example implementation of the present disclosure, data structures of active dump file 210 and inactive dump file 220 are the same and may include a file header and a file body. Hereinafter, the data structure of a dump file will be described with reference to FIG. 8.

Figure 8:
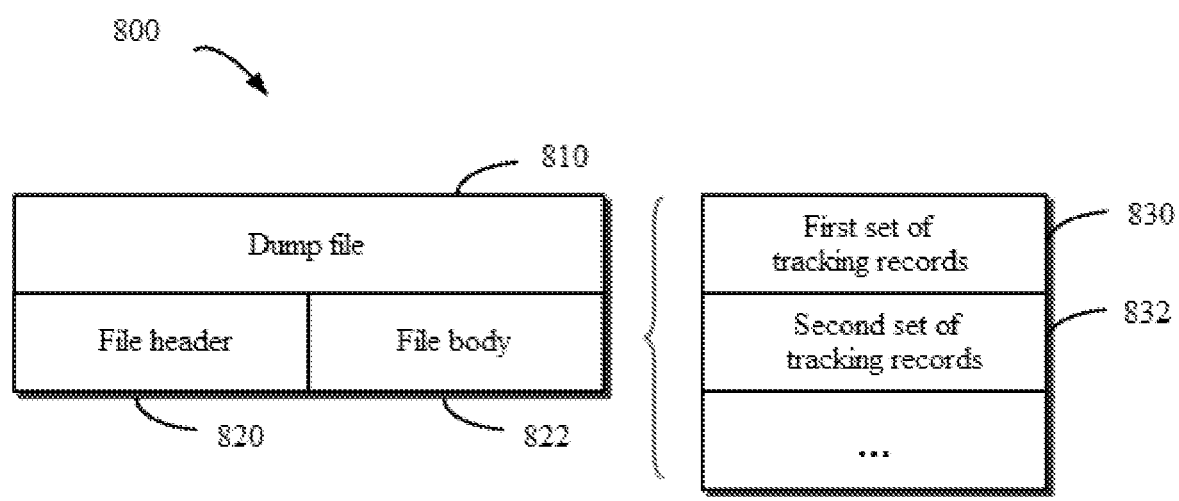
FIG. 8 schematically illustrates a block diagram of a data structure of a dump file according to an example implementation of the present disclosure.

FIG. 8 schematically illustrates block diagram 800 of a data structure of a dump file according to an example implementation of the present disclosure. Dump file 810 may include file header 820 and file body 822. The file header may include a size of a set of tracking records 230. Assuming that a size of each tracking record is S, the size of a set of tracking records 230 here may be expressed as an integer multiple of one tracking record. For example, the size of a set of tracking records may be defined as S*n (n is a positive integer). The file header may include a file size threshold. The threshold here indicates a maximum storage capacity of the file. For example, the size threshold may be defined as S*n*m (m is a positive integer), indicating that the dump file may accommodate up to n*m tracking records.

According to an example implementation of the present disclosure, the size of a set of tracking records 230 may also be expressed with the number of tracking records. For example, it is specified that a set of tracking records may include n tracking records. It may be specified how many sets of tracking records may be included in the dump file. For example, the file size threshold may be defined as n*m, which indicates that the dump file may store up to m sets of tracking records, and each set of tracking records includes n tracking records.

File body 822 may be used for storing multiple sets of received tracking records. In an initial stage of the method of running the technical solution for managing tracking records, the file body may be set to empty. At this moment, each set of received tracking records may be added to a corresponding position of active dump file 210. According to an example implementation of the present disclosure, as active buffer 610 becomes full, dump signal 412 may be generated periodically. Each time when dump signal 412 is received, another set of tracking records may be received from active buffer 610, and the another set of tracking records may be added to the active dump file. For example, a first set of tracking records 830 may be added to the 0th to (n−1)th positions in file body 822, a second set of tracking records 832 may be added to the nth to (2n−1)th positions in file body 822, and so on.

With an example implementation of the present disclosure, various configuration information may be recorded in file header 820, and the collected tracking records may be recorded in file body 822. In this way, a set of newly received tracking records may be continuously added to the end of file body 822. By comparing the size of a current dump file with a size threshold recorded in the file header, it may be conveniently determined whether the current dump file is full.

The above has described how to add the newly received tracking record to active dump file 210. Hereinafter, how to start a process of backing up to storage device 250 when active dump file 210 is full will be described by returning to FIG. 5. At block 530, storage signal 240 for storing active dump file 210 into backup device 250 associated with application system 110 is generated according to a determination that a size of active dump file 210 meets a predetermined size threshold and according to a determination that inactive dump file 220 is marked as a ready state. When active dump file 210 is full, dump signal 240 may start storage process 430 of storing active dump file 210 into backup device 250.

During storage process 430, since the addition of newly received tracking records to active dump file 210 cannot be continued, it is necessary to ensure that inactive dump file 220 may replace active dump file 210 to generate the storage signal. Here, the ready state indicates that inactive dump file 220 is available for storing another set of tracking records to be received in the future. In this way, it can be ensured that active dump file 210 and inactive dump file 220 may alternately serve in subsequent operations.

According to an example implementation of the present disclosure, active dump file 210 and inactive dump file 220 may be exchanged. At this moment, the exchanged active dump file may be used for storing another set of tracking records to be received in the future. With an example implementation of the present disclosure, active dump file 210 and inactive dump file 220 may be alternately used for accommodating each set of received tracking records. In this way, it is possible to avoid a situation where a received tracking record cannot be accommodated due to uploading the tracking record to backup device 250.

Figure 9:
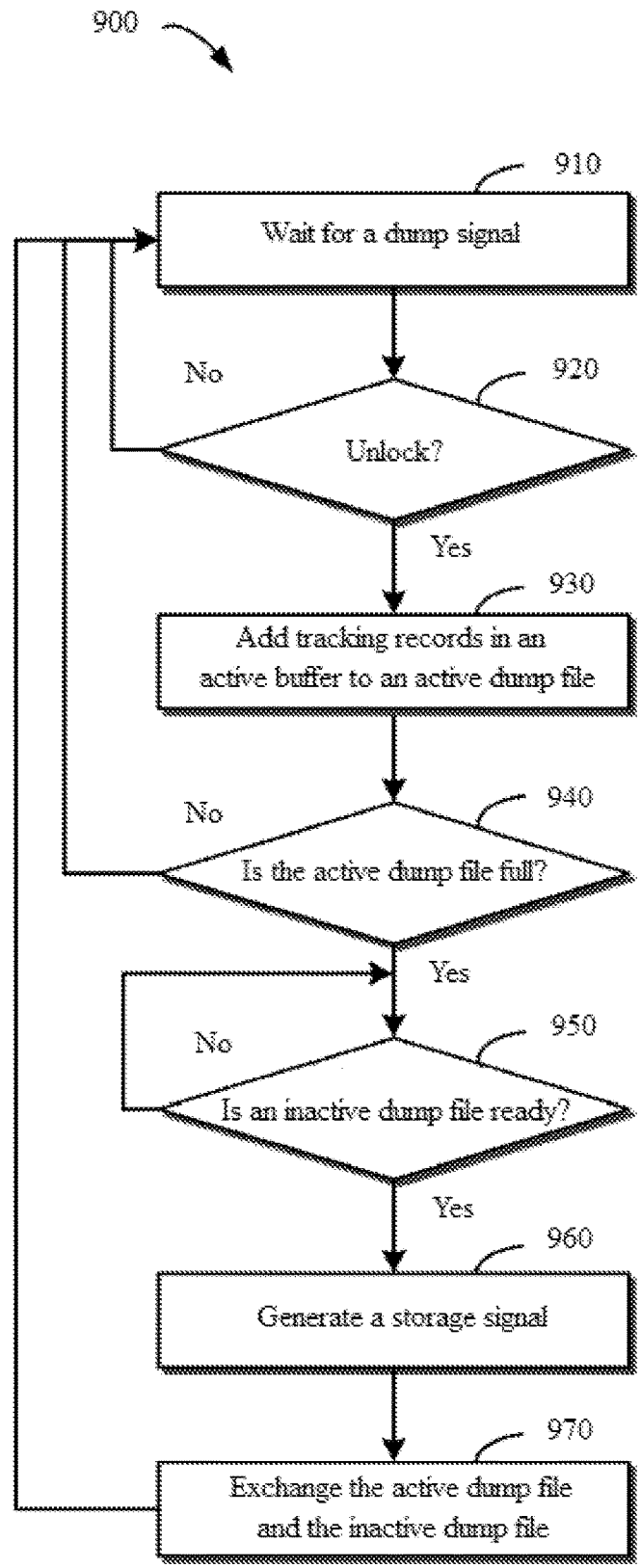
FIG. 9 schematically shows a flowchart of a method for dumping a tracking record according to an example implementation of the present disclosure.

Hereinafter, more details of dump process 420 will be described in detail with reference to FIG. 9, which schematically shows a flowchart of method 900 for dumping a tracking record according to an example implementation of the present disclosure. At block 910 in FIG. 9, dump signal 412 may be awaited. Here, dump signal 412 is a signal from collection process 410. If dump signal 412 is received, the dump process is unlocked at block 920 and method 900 proceeds to block 930. If dump signal 412 is not received, the waiting continues until the dump process is unlocked.

At block 930, a set of tracking records in active buffer 610 may be added to an active dump file. Various sets of tracking records may be continuously received until it is determined at block 940 that active dump file 210 is full. Specifically, assuming that the threshold size of active dump file 210 is m and m sets of tracking records have been received, active dump file 210 is full. At block 950, if an inactive dump file is ready, method 900 proceeds to block 960 to generate storage signal 240. Otherwise, it will wait for the inactive dump file to be ready. At block 970, active dump file 210 and inactive dump file 220 may be exchanged. At this moment, method 900 returns to block 910 to continue waiting for next dump signal 412.

Figure 10:
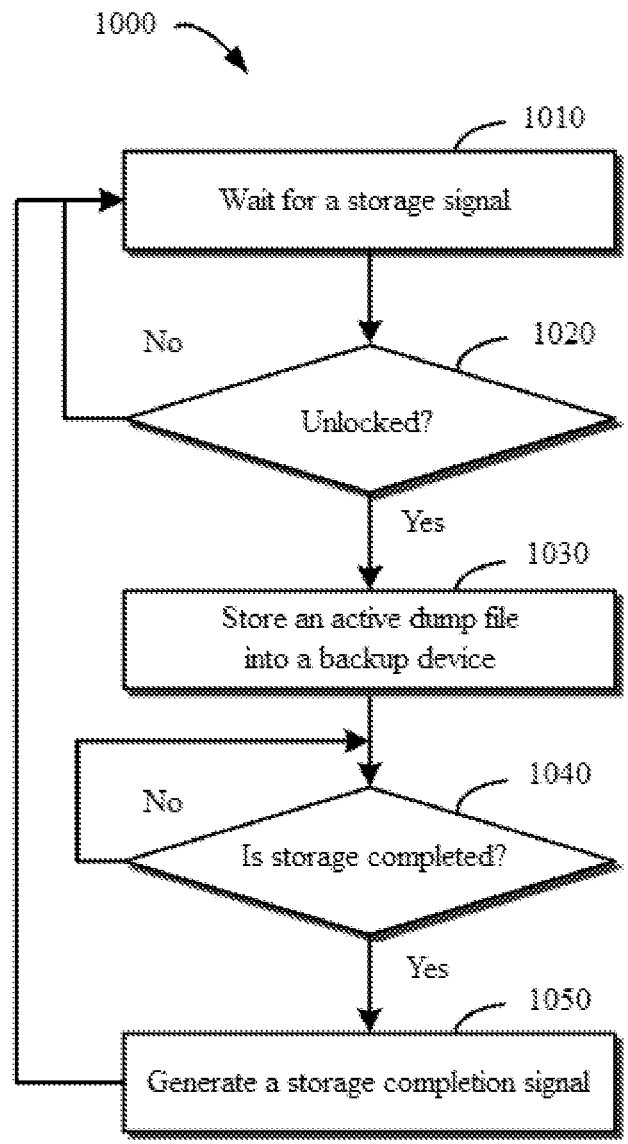
FIG. 10 schematically shows a flowchart of a method for storing a dump file according to an example implementation of the present disclosure.

According to an example implementation of the present disclosure, storage signal 240 may be used for starting storage process 430. For example, storage signal 240 may notify application system 110 to upload active dump file 210 to backup device 250. For another example, storage signal 240 may notify backup device 250 to retrieve active dump file 210 from application system 110. Hereinafter, more details about storage process 430 will be described with reference to FIG. 10. FIG. 10 schematically shows a flowchart of method 1000 for storing a dump file according to an example implementation of the present disclosure. As shown in FIG. 10, at block 1010, storage signal 240 may be awaited. Storage signal 240 here is a signal from dump process 420. If storage signal 420 is received, the storage process is unlocked at block 1020 and method 1000 proceeds to block 1030. If storage signal 420 is not received, the waiting continues until the storage process is unlocked.

At block 1030, a tracking record in active dump file 210 may be stored in backup device 250. Specifically, active dump file 210 may be uploaded from application system 110 to the backup device. Alternatively and/or additionally, backup device 250 may be instructed to retrieve the tracking record from active dump file 210. At block 1040, it may be determined whether the storage process has been completed, and in the case where the storage process is uncompleted, storing non-stored tracking records into backup device 250 may be continued. If all tracking records in active dump file 210 have been stored in backup device 250, method 1000 proceeds to block 1050 to generate storage completion signal 432. Method 1000 may return to block 1010 to wait for a next storage signal.

According to an example implementation of the present disclosure, the state of inactive dump file 220 may be determined according to whether active dump file 210 has been stored in backup device 250. If all tracking records in active dump file 210 have been stored in backup device 250, it may be determined that inactive dump file 220 is in a ready state.

According to an example implementation of the present disclosure, storage completion signal 432 may be received from backup device 250. Here, storage completion signal 432 is a signal generated at backup device 250 and indicating that active dump file 210 has been stored in backup device 250. With an example implementation of the present disclosure, storage signal 240 may be generated based on receipt of storage completion signal 432. In this way, it is possible to determine the timing of generating storage signal 240 and avoid repeatedly viewing in application system 110 and confirming whether the tracking records in active dump file 210 have been stored in backup device 250.

The examples of the methods according to the present disclosure have been described in detail above with reference to FIGS. 2 to 10, and the implementations of a corresponding apparatus will be described below. Specifically, an apparatus for managing tracking records in an application system is provided. Here, the application system includes an active dump file and an inactive dump file. The apparatus includes: a receiving module configured to receive a set of tracking records indicating a state of the application system; an addition module configured to add the set of tracking records to the active dump file; and a generation module configured to generate a storage signal for storing the active dump file into a backup device associated with the application system according to a determination that a size of the active dump file meets a predetermined size threshold and according to a determination that a state of the inactive dump file is a ready state, the ready state indicating that the inactive dump file is available for storing another set of tracking records to be received in the future. According to an example implementation of the present disclosure, the apparatus further includes a module configured to perform other steps of method 500.

Figure 11:
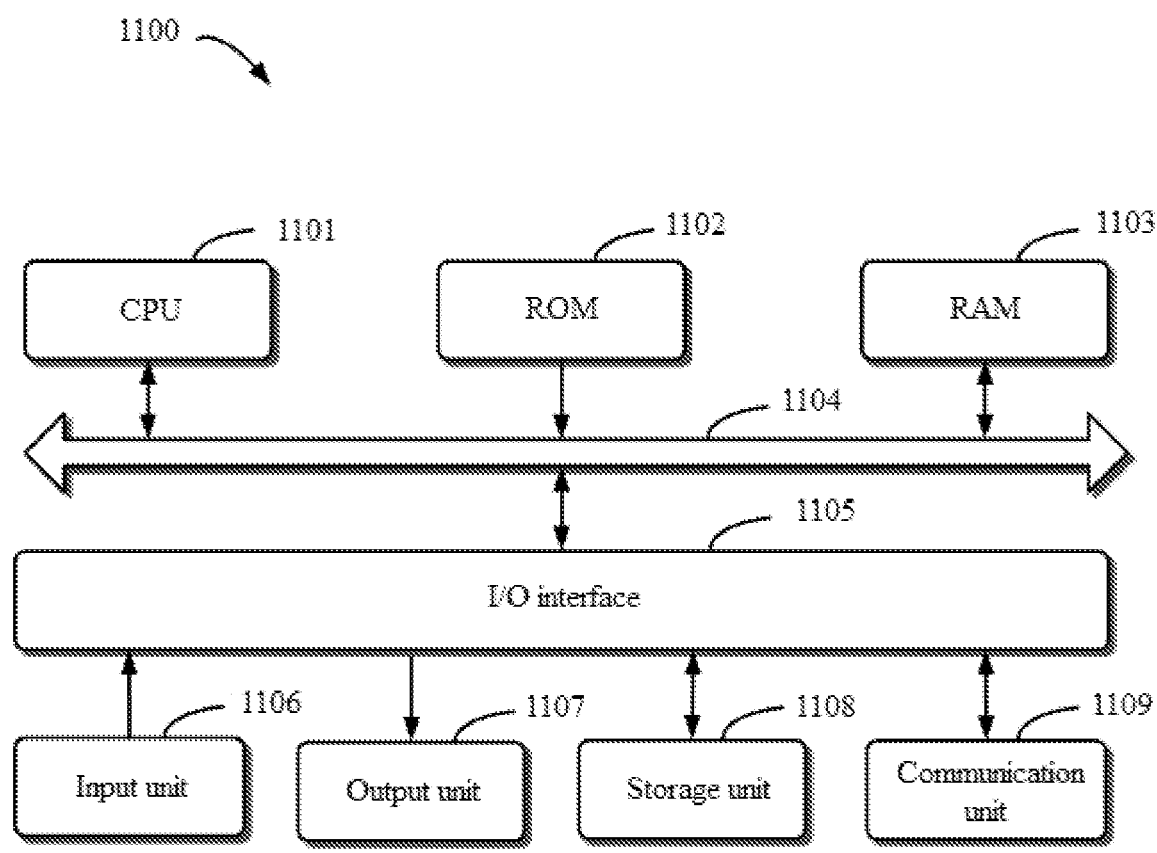
FIG. 11 schematically illustrates a block diagram of a device for managing tracking records in an application system according to an example implementation of the present disclosure.

FIG. 11 schematically illustrates a block diagram of device 1100 for managing a backup device according to an example implementation of the present disclosure. As shown in the figure, device 1100 includes general processing unit (CPU) 1101 that may perform various appropriate actions and processing according to computer program instructions stored in read-only memory (ROM) 1102 or computer program instructions loaded from storage unit 1108 to random access memory (RAM) 1103. In RAM 1103, various programs and data required for the operation of device 1100 may also be stored. CPU 1101, ROM 1102, and RAM 1103 are connected to each other through bus 1104. Input/output (I/O) interface 1105 is also connected to bus 1104.

Multiple components in device 1100 are connected to I/O interface 1105, including: input unit 1106, such as a keyboard or a mouse; output unit 1107, such as various types of displays or speakers; storage unit 1108, such as a magnetic disk or an optical disk; and communication unit 1109, such as a network card, a modem, or a wireless communication transceiver. Communication unit 1109 allows device 1100 to exchange information/data with other devices over a computer network such as the Internet and/or various telecommunication networks.

The various processes and processing described above, such as methods 500, 700, 900, and 1000, may be performed by processing unit 1101. For example, in some implementations, the above methods may be implemented as a computer software program that is tangibly included in a machine-readable medium, such as storage unit 1108. In some implementations, some or all of the computer program may be loaded and/or installed onto device 1100 via ROM 1102 and/or communication unit 1109. One or more steps of the methods described above may be performed when the computer program is loaded into RAM 1103 and executed by CPU 1101. Alternatively, in other implementations, CPU 1101 may also be configured to implement the above-described process/method in any other suitable manner.

According to an example implementation of the present disclosure, an electronic device is provided. The electronic device includes: at least one processor; and a memory coupled to the at least one processor and having instructions stored therein. When executed by the at least one processor, the instructions cause the device to execute actions for managing tracking records in an application system. The application system includes an active dump file and an inactive dump file. The actions include: receiving a set of tracking records indicating a state of the application system; adding the set of tracking records to the active dump file; and generating a storage signal for storing the active dump file into a backup device associated with the application system according to a determination that a size of the active dump file meets a predetermined size threshold and according to a determination that a state of the inactive dump file is a ready state, the ready state indicating that the inactive dump file is available for storing another set of tracking records to be received in the future.

According to an example implementation of the present disclosure, the active dump file and the inactive dump file each include: a file header for indicating a size of the set of tracking records and a size threshold; and a file body for storing the received multiple tracking records.

According to an example implementation of the present disclosure, the actions further include: exchanging the active dump file and the inactive dump file, so that the exchanged active dump file is used for storing another set of tracking records to be received in the future.

According to an example implementation of the present disclosure, the application system includes an active buffer. Receiving the set of tracking records includes at least one of the following: retrieving a set of tracking records from the active buffer according to receipt of a dump signal; and waiting for the dump signal according to no receipt of the dump signal.

According to an example implementation of the present disclosure, the dump signal is generated according to a determination of a comparison between the number of tracking records in the active buffer and a predetermined number threshold.

According to an example implementation of the present disclosure, the application system further includes an inactive buffer, the active buffer and the inactive buffer being exchanged according to a determination that the number of tracking records in the active buffer meets a predetermined number threshold.

According to an example implementation of the present disclosure, the actions further include: receiving another set of tracking records indicating a state of the application system; and adding the another set of tracking records to the active dump file.

According to an example implementation of the present disclosure, the storage signal is used for performing at least one of the following: notifying to upload the active dump file to the backup device; and notifying the backup device to retrieve the active dump file.

According to an example implementation of the present disclosure, determining that the state of the inactive dump file is the ready state includes: determining that the inactive dump file is marked as the ready state according to a determination that the active dump file has been stored in the backup device.

According to an example implementation of the present disclosure, determining that the active dump file has been stored in the backup device includes: receiving a storage completion signal from the backup device, the storage completion signal indicating that the active dump file has been stored in the backup device.

According to an example implementation of the present disclosure, a computer program product is provided. The computer program product is tangibly stored on a non-transitory computer-readable medium and includes machine-executable instructions for performing the methods according to the present disclosure.

According to an example implementation of the present disclosure, a computer-readable medium is provided. The computer-readable medium stores machine-executable instructions that, when executed by at least one processor, cause the at least one processor to implement the methods according to the present disclosure.

The present disclosure may be a method, a device, a system, and/or a computer program product. The computer program product may include a computer-readable storage medium having computer-readable program instructions for performing various aspects of the present disclosure loaded thereon.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, an RAM, an ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or a protruding structure within a groove having instructions stored thereon, and any suitable combination of the foregoing. The computer-readable storage medium as used herein is not to be interpreted as transient signals per se, such as radio waves or other freely propagated electromagnetic waves, electromagnetic waves propagated through waveguides or other transmission media (e.g., light pulses through fiber-optic cables), or electrical signals transmitted through electrical wires.

The computer-readable program instructions described herein may be downloaded from the computer-readable storage medium to various computing/processing devices or downloaded to an external computer or an external storage device over a network, such as the Internet, a local area network (LAN), a wide area network (WAN), and/or a wireless network. The network may include copper transmission cables, fiber optic transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages such as Smalltalk, C++, etc., as well as conventional procedural programming languages such as the "C" language or similar programming languages. The computer-readable program instructions can be completely executed on a user's computer, partially executed on a user's computer, executed as a separate software package, partially executed on a user's computer and partially executed on a remote computer, or completely executed on a remote computer or a server. In the case where a remote computer is involved, the remote computer may be connected to a user's computer through any type of networks, including an LAN or a WAN, or may be connected to an external computer (e.g., connected through the Internet by using an Internet service provider). In some implementations, an electronic circuit, such as a programmable logic circuit, a field programmable gate array (FPGA), or a programmable logic array (PLA), may be customized by utilizing status information of computer-readable program instructions. The electronic circuit may execute the computer-readable program instructions to implement various aspects of the present disclosure.

Various aspects of the present disclosure are described herein with reference to flowcharts and/or block diagrams of the method, the apparatus (system), and the computer program product according to the implementations of the present disclosure. It should be understood that each block in the flowcharts and/or the block diagrams and combinations of the blocks in the flowcharts and/or the block diagrams may be implemented by computer-readable program instructions.

The computer-readable program instructions may be provided to a processing unit of a general-purpose computer, a special-purpose computer, or other programmable data processing apparatuses, thereby producing a machine, such that when these instructions are executed by the processing unit of the computer or other programmable data processing apparatuses, an apparatus for implementing functions/actions specified in one or more blocks in the flowcharts and/or the block diagrams is generated. The computer-readable program instructions may also be stored in the computer-readable storage medium. The instructions enable a computer, a programmable data processing apparatuses, and/or other devices to operate in a specific manner, so that the computer-readable medium storing the instructions includes an article of manufacture that includes instructions for implementing various aspects of functions/actions specified in one or more blocks in the flowcharts and/or the block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process. Thus, the instructions executed on the computer, other programmable data processing apparatuses, or other devices implement the functions/actions specified in one or more blocks in the flowcharts and/or the block diagrams.

The flowcharts and block diagrams in the accompanying drawings illustrate architectures, functions, and operations of possible implementations of systems, methods, and computer program products according to multiple implementations of the present disclosure. In this regard, each block in the flowcharts or block diagrams can represent a module, a program segment, or a portion of an instruction that includes one or more executable instructions for implementing specified logical functions. In some alternative implementations, functions labeled in the blocks may occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various implementations of the present disclosure have been described above. The foregoing description is illustrative rather than exhaustive, and is not limited to the disclosed various implementations. Multiple modifications and variations will be apparent to those skilled in the art without departing from the scope and spirit of the illustrated various implementations. The selection of terms as used herein is intended to best explain the principles and practical applications of the various implementations or the improvements to technologies on the market, or to enable other persons of ordinary skill in the art to understand the implementations disclosed here.

The invention claimed is:

1. A method for managing tracking records in an application system, the application system comprising an active buffer, an inactive buffer, an active dump file, and an inactive dump file, the method comprising:
receiving a set of tracking records indicating a state of the application system, wherein receiving the set of tracking records comprises retrieving the set of tracking records from the active buffer by a dump process in response to receipt of a dump signal, wherein the dump signal is generated according to a determination that a total number of tracking records in the active buffer has reached a predetermined number threshold, wherein the dump process waits for receipt of the dump signal, and wherein receipt of the dump signal unlocks the dump process;
adding, by the dump process, the set of tracking records from the active buffer to the active dump file;
generating, by the dump process further in response to being unlocked by receipt of the dump signal, a storage signal that notifies a backup device to start retrieving tracking records contained in the active dump file from the application system and to store the retrieved tracking records into a single backup file contained in the backup device, and wherein the storage signal is generated by the dump process in response to the dump process determining both i) that a size of the active dump file meets a predetermined size threshold and ii) that a state of the inactive dump file is a ready state, the ready state indicating that the inactive dump file is available for storing another set of tracking records to be received in the future;
further in response to the size of the active dump file meeting the predetermined size threshold and the state of the inactive dump file being the ready state, exchanging the active dump file and the inactive dump file, so that the exchanged active dump file is used for storing subsequently received tracking records; and
exchanging the active buffer and the inactive buffer according to a determination that the number of tracking records in the active buffer meets a predetermined number threshold.

2. The method according to claim 1, wherein the active dump file and the inactive dump file each comprise:
a file header for indicating a size of the set of tracking records and the size threshold; and
a file body for storing a plurality of received tracking records.

3. The method according to claim 1, further comprising:
receiving another set of tracking records indicating a state of the application system; and
adding the another set of tracking records to the active dump file.

4. The method according to claim 1, wherein determining that the state of the inactive dump file is the ready state comprises: determining that the inactive dump file is marked as the ready state according to a determination that the active dump file has been stored into the backup device.

5. The method according to claim 4, wherein determining that the active dump file has been stored in the backup device comprises:
receiving a storage completion signal from the backup device, the storage completion signal indicating that the active dump file has been stored into the backup device.

6. An electronic device, comprising:
at least one processor; and
a memory coupled to the at least one processor and having instructions stored therein, wherein when executed by the at least one processor, the instructions cause the device to execute actions for managing tracking records in an application system, the application system comprising an active buffer, an inactive buffer, an active dump file, and an inactive dump file, and the actions comprise:
receiving a set of tracking records indicating a state of the application system, wherein receiving the set of tracking records comprises retrieving the set of tracking records from the active buffer by a dump process in response to receipt of a dump signal, wherein the dump signal is generated according to a determination that a total number of tracking records in the active buffer has reached a predetermined number threshold, wherein the dump process waits for receipt of the dump signal, and wherein receipt of the dump signal unlocks the dump process;
adding, by the dump process, the set of tracking records from the active buffer to the active dump file;
generating, by the dump process further in response to being unlocked by receipt of the dump signal, a storage signal that notifies a backup device to start retrieving tracking records contained in the active dump file from the application system and to store the retrieved tracking records into a single backup file contained in the backup device, and wherein the storage signal is generated by the dump process in response to the dump process determining both i) that a size of the active dump file meets a predetermined size threshold and ii) that a state of the inactive dump file is a ready state, the ready state indicating that the inactive dump file is available for storing another set of tracking records to be received in the future;
further in response to the size of the active dump file meeting the predetermined size threshold and the state of the inactive dump file being the ready state, exchanging the active dump file and the inactive dump file, so that the exchanged active dump file is used for storing subsequently received tracking records; and exchanging the active buffer and the inactive buffer according to a determination that the number of tracking records in the active buffer meets a predetermined number threshold.

7. The device according to claim 6, wherein the active dump file and the inactive dump file each comprise:
 a file header for indicating a size of the set of tracking records and the size threshold; and
 a file body for storing a plurality of received tracking records.

8. The device according to claim 6, wherein the actions further comprise:
 receiving another set of tracking records indicating a state of the application system; and
 adding the another set of tracking records to the active dump file.

9. The device according to claim 6, wherein determining that the state of the inactive dump file is the ready state comprises: determining that the inactive dump file is marked as the ready state according to a determination that the active dump file has been stored in the backup device.

10. A computer program product having a non-transitory computer readable medium which stores a set of instructions to manage tracking records in an application system, the application system including an active buffer, an inactive buffer, an active dump file, and an inactive dump file; the set of instructions, when carried out by computerized circuitry, causing the computerized circuitry to perform a method of:
 receiving a set of tracking records indicating a state of the application system, wherein receiving the set of tracking records comprises retrieving the set of tracking records from the active buffer by a dump process in response to receipt of a dump signal, wherein the dump signal is generated according to a determination that a total number of tracking records in the active buffer has reached a predetermined number threshold, wherein the dump process waits for receipt of the dump signal, and wherein receipt of the dump signal unlocks the dump process;
 adding, by the dump process, the set of tracking records from the active buffer to the active dump file;
 generating, by the dump process further in response to being unlocked by receipt of the dump signal, a storage signal that notifies a backup device to start retrieving tracking records contained in the active dump file from the application system and to store the retrieved tracking records into a single backup file contained in the backup device, and wherein the storage signal is generated by the dump process in response to the dump process determining both i) that a size of the active dump file meets a predetermined size threshold and II) that a state of the inactive dump file is a ready state, the ready state indicating that the inactive dump file is available for storing another set of tracking records to be received in the future;
 further in response to the size of the active dump file meeting the predetermined size threshold and the state of the inactive dump file being the ready state, exchanging the active dump file and the inactive dump file, so that the exchanged active dump file is used for storing subsequently received tracking records; and
 exchanging the active buffer and the inactive buffer according to a determination that the number of tracking records in the active buffer meets a predetermined number threshold.

\* \* \* \* \*